Sept. 17, 1940.                  B. S. AIKMAN                    2,215,343
                            SPEED CONTROLLED BRAKE
                            Filed July 29, 1939           3 Sheets-Sheet 1

INVENTOR
BURTON S. AIKMAN
BY
ATTORNEY

Sept. 17, 1940. B. S. AIKMAN 2,215,343
SPEED CONTROLLED BRAKE
Filed July 29, 1939 3 Sheets-Sheet 2

INVENTOR
BURTON S. AIKMAN
BY
ATTORNEY

Patented Sept. 17, 1940

2,215,343

UNITED STATES PATENT OFFICE 2,215,343

SPEED CONTROLLED BRAKE

Burton S. Aikman, Wilkinsburg, Pa., assignor to The Westinghouse Air Brake Company, Wilmerding, Pa., a corporation of Pennsylvania Application July 29, 1939, Serial No. 287,274

15 Claims. (Cl. 303—21)

This invention relates to fluid pressure brakes and more particularly to fluid pressure controlled speed responsive apparatus operative to govern the degree of application of the brakes for preventing wheel sliding.

It is common knowledge that in order to stop a moving vehicle within a desirably short distance, it is necessary that all wheels be permitted to roll freely while decelerating in response to an application of the brakes, and that for production of maximum braking effect the wheels should consequently at all times be subjected to braking friction just short of that sufficient to cause slipping. The force with which the brakes are applied must therefore be gradually reduced to correspond with the changing coefficient of friction between the brake shoes and wheels, it being understood that the latter frictional force increases as the vehicle speed declines.

One object of my invention is to provide an improved fluid pressure controlled apparatus automatically operative according to the speed of a vehicle to limit the pressure of fluid attainable in the brake cylinder of the vehicle air brake system to a value producing maximum braking effect without causing wheel slipping.

It is another object of the invention to provide an apparatus of the above description which is sufficiently sensitive to abnormal or sudden reduction in the rotative speed of a vehicle wheel, resulting from initial slipping thereof, to effect a quick release of braking force before the wheel ceases rotating, thereby preventing sliding of the wheels.

A further object of the invention is to provide a speed controlled, anti-wheel sliding apparatus governed in response to variations in a control pressure, which pressure is in turn determined during a brake application by the rate at which a constantly replenished supply of fluid under pressure is discharged to atmosphere through a calibrated port of a valve device operated by the vehicle wheel.

Figures 1, 2:
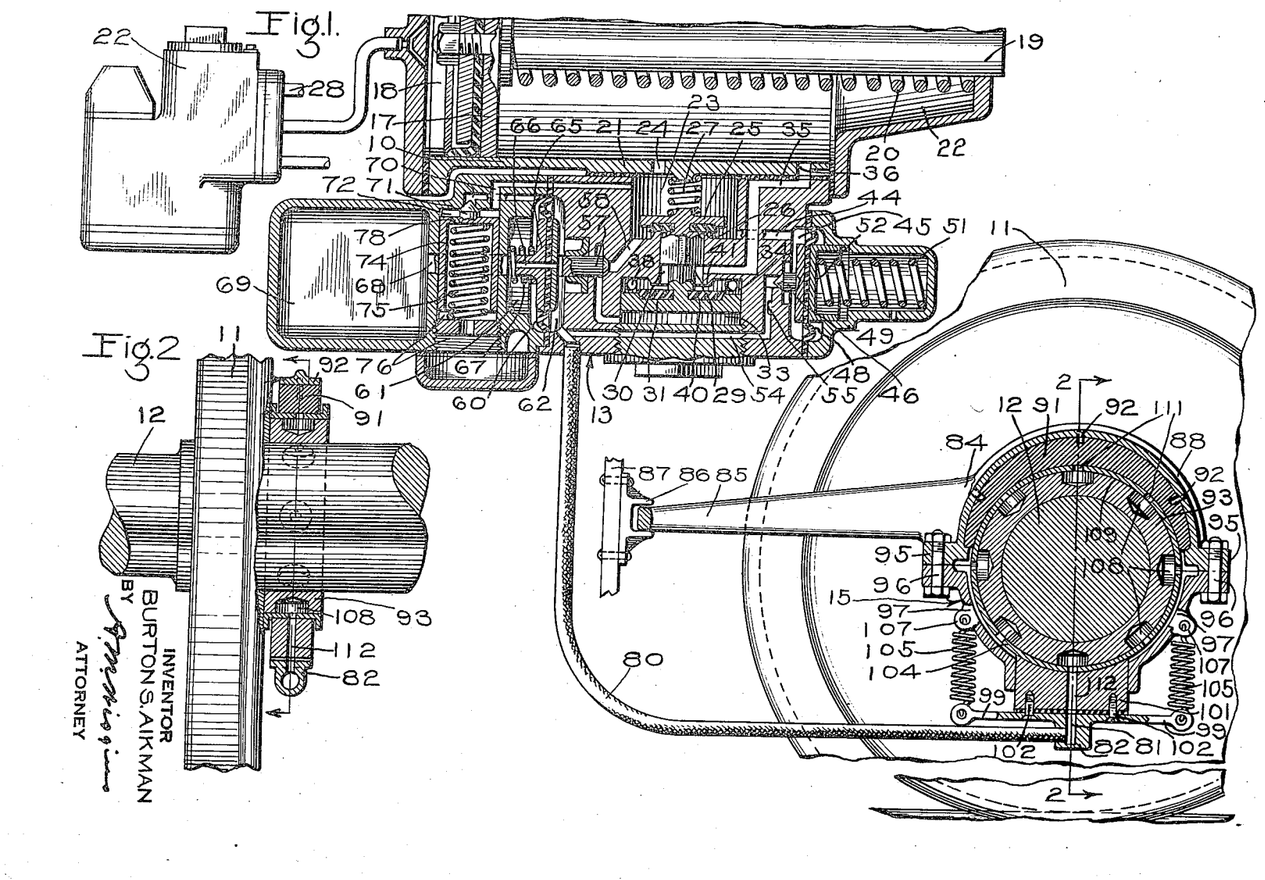
Fig. 1 is a diagrammatic elevational view, mainly in section, of a speed responsive fluid pressure brake control apparatus embodying features of the invention.
Fig. 2 is an end view, partly in section and taken substantially along the line 2—2 of Fig. 1.

Other objects and advantages of the invention will be apparent in the following description thereof, taken in connection with the accompanying drawings, in which:

Apparatus shown in Fig. 1

As shown in Fig. 1 of the drawings, one form of apparatus embodying the invention and associated portions of a vehicle truck may comprise a brake cylinder device 10, which is operative through the medium of suitable brake levers, not illustrated, to apply braking force to a wheel 11 having an axle 12, a control valve device 13 associated with the brake cylinder device, and a control pressure governor mechanism operatively mounted on the axle and indicated generally by the character 15.

The brake cylinder device 10 may be of usual construction and as illustrated comprises a cylinder within which is slidably mounted a piston 17 subject to the pressure of fluid supplied to a pressure chamber 18 for operating a piston rod 19 against the force of a coil spring 20, which is disposed in a normally vented chamber 22. The brake cylinder device has a bracket wall 21, to the outer surface of which the control valve device 13 may be secured by bolts, not shown. A relay valve device 22 is provided for supplying fluid under pressure to the brake cylinder chamber 18 from a constantly charged supply pipe 28, which communicates with the usual main reservoir, not shown. The relay valve device may be similar to that disclosed in the United States Patent 2,096,491 issued October 19, 1937, to E. E. Hewitt.

The control valve device 13 comprises a casing structure having formed therein a valve chamber 23 which communicates through a port 24 formed in the wall 21 with the piston bore of the brake cylinder device 10, which port 24 is adapted to be uncovered by the brake cylinder piston 17 upon movement thereof to a brake applying position as hereinafter explained. Mounted in the valve chamber 23 is a valve member 25, which is adapted to be held in seating engagement with a seat rib 26 formed in the casing under the force of a coil spring 27 which is interposed between the valve and the wall of the chamber 23. The valve 25 has a fluted stem portion 29 slidably mounted in a bore 30 formed in the casing, the lower end of which stem is secured to a loosely fitted piston 31 which is interposed between a piston chamber 33 and a chamber 34 communicating by way of a passage 35 and a port 36 with the piston bore of the brake cylinder device 10. The port 36 is located in the wall 21 of the brake cylinder device beyond the range of movement of the piston 17. The chamber 34 is at all times connected with the atmosphere by way of suitable ports 38, and is adapted to be cut off from communication from the bore 30 upon upward movement of the piston 31 by means of a gasket 40 which is adapted to seat on a rib 41 surrounding the bore.

The valve chamber 23 also communicates by way of a passage 44 with a chamber 45 formed in the casing and containing a needle valve element 46, which is adapted to be operated by a flexible diaphragm 48 that is interposed between the casing and a cap member 49 suitably secured thereto. A coil spring 51 is interposed between the end wall of the cap member 49 and a follower member 52 engaging the diaphragm 48, and is adapted normally to act through the medium of the diaphragm to hold the needle valve element 46 in seated position as shown in the drawings. The diaphragm 48 is adapted to respond to a predetermined increase in fluid pressure in chamber 45 to operate the needle valve element 46 for effecting supply of fluid under pressure from the chamber to a passage 54 having a restricted portion 55, the needle valve element being thus adapted to maintain a substantially uniform flow of fluid under pressure through the passage 54 as hereinafter more fully explained.

Communication from the valve chamber 23 to the chamber 33 is controlled by a valve element 57, which is interposed in a passage 58 formed in the casing of the device 13, and has a stem portion suitably secured to a diaphragm 60 that is mounted in the casing and is interposed between a chamber 61 and a chamber 62 communicating with the passage 54. A follower element 65 is mounted in engagement with the side of the diaphragm opposite the valve element 57 and is provided with a restricted passage 66 forming communication between the chambers 61 and 62. A coil spring 67 is interposed between the follower element 65 and the wall of the chamber 61 for acting on the diaphragm in opposition to the pressure of fluid in the chamber 62 and for normally maintaining seated the valve element 57. The chamber 61 communicates by way of a passage 68 with a volume chamber 69 and is adapted at times to communicate with the valve chamber 23 by way of a passage 70, which is normally maintained closed by a valve member 71 that is disposed in a valve chamber 72 communicating with the passage. The valve member 71 is carried by a piston 74, which is mounted in a suitable bore formed in the casing and is subject to the pressure of fluid supplied to the chamber 72 and to the opposing force of a spring 75 contained in a volume chamber 76, which communicates with the chamber 72 by way of a restricted passage 78 formed in the piston.

The passage 54 and the chamber 62 together communicate with a flexible conduit 80, which is in turn connected to a chamber 81 formed in a member 82 constituting a portion of the governor mechanism 15 associated with the wheel and axle assembly.

The control pressure governor mechanism 15 is adapted to operate in accordance with the speed of rotation of the wheel and axle assembly to control the pressure of fluid supplied to the conduit 80, said fluid pressure being maintained at a minimum value while the axle is operated at high speed, and at correspondingly increased values during deceleration of the axle as hereinafter explained. The governor mechanism 15 comprises, in addition to the member 82, a torque arm member 84, which has an arm portion 85 operatively connected to a bracket 86 carried by a portion 87 of the vehicle frame, and an arcuate portion 88 adapted to be disposed above the axle 12. An arcuate bearing member 91 formed of self-lubricating carbonaceous material is secured within the semicircular portion 88 of the member 84 by means of pins such as 92, and has the inner surface thereof suitably formed for engagement with an annular member 93, which is in turn press-fitted on or otherwise suitably secured to the axle 12. Formed on the semicircular portion 88 of the member 84 and disposed at opposite sides of the axle are flange portions 95, which are adapted to be fitted with bolts 96 for supporting a pair of downwardly extending guide members 97, respectively, the inner surfaces of which are spaced from the annular member 93.

The member 82 is provided with oppositely extending arm portions 99 respectively disposed beneath the members 97, and has mounted thereon between the arm portions a valve seat block 101, which is preferably formed of a carbonaceous material similar to that of the bearing member 91. Suitable means such as screws 102 may be provided for holding the valve seat block 101 in place. The block 101 is slidably fitted between the lower ends of the guide members 97 and is provided with a curved bearing face 104 adapted for sealing and sliding engagement with a ring element 109 secured to the annular member 93. The member 82 and the valve seat block 101 carried thereby are yieldingly supported from the respective guide members 97 by a plurality of tension springs 105, the lower ends of which are secured to the arm portions 99 of the member 82 and the upper ends of which are connected to eyelet portions 107 formed on the guide members. The springs 105 are adapted to exert sufficient upward force on the member 82 to maintain the surface 104 of the block 101 in sliding engagement with the annular member 93 at all times.

The annular member 93 has formed therein a plurality of circumferentially spaced chambers or cavities 108, the outer ends of which are covered by the ring element 109, which is closely fitted on and forms a part of the annular member. Restricted ports 111 are formed in the ring element 109, each of which ports communicates with one of the cavities 108. During rotation of the axle and of the member 93 carried thereby, the ports 111 are adapted to be brought successively into registration with a passage 112 formed in the block 101 and communicating with the chamber 81 and conduit 80.

It should be understood that the fluid pressure brake equipment associated with the brake cylinder device 10 but not shown in the drawings is of the high speed type, and is operative in effecting an application of the brakes to supply fluid to the chamber 18 at a pressure predetermined in accordance with the desired degree of brake application.

Fluid under pressure thus supplied to the brake cylinder device may be delivered directly from a main or other relatively large reservoir supply by operation of the relay valve device 22 in the usual manner, so that the amount of fluid under pressure available for operation of the brake cylinder device is large enough to compensate for the use of a relatively small quantity of such fluid for operation of the speed controlled apparatus shown in Fig. 1, as hereinafter explained.

When fluid under pressure is thus supplied to the piston chamber 18 in order to effect an application of the brakes, the piston 17 is moved against the opposing force of the spring 20 for causing the piston rod 19 to operate the usual brake rigging levers to apply braking force to the associated wheel and axle assembly. As the piston 17 is moved to the right in the brake cylinder to a position corresponding to the application of an effective braking force to the wheels, the port 24 in the lower wall 21 of the brake cylinder is uncovered and a communication thus established through which fluid under pressure is supplied from the chamber 18 to the valve chamber 23. Upon the initial charging of the valve chamber 23, fluid under pressure flow therefrom through the passage 70 to the chamber 72 at a rate faster than that of flows therefrom through the restricted port 78 in the piston 74, and thereby forces the piston downwardly against the pressure of the spring 75 for unseating the valve 71, whereupon fluid under pressure is admitted to the diaphragm chamber 61 and by way of the passage 68 to the volume chamber 69.

At the same time, fluid under pressure flows from the valve chamber 23 through the passage 44 to the chamber 45, and acts against the diaphragm 48 in opposition to the force exerted by the spring 51. Assuming that brake cylinder pressure has been increased to a predetermined value corresponding with the power of the spring 51, the fluid pressure in chamber 45 then forces the diaphragm 48 outwardly for moving the needle valve member 46 away from its seat. Fluid under pressure is then supplied from the chamber 45 past the unseated needle valve to the passage 54 at a rate determined by the restricted portion 55, and thence through the conduit to the chamber 81 in the member 82 of the governor mechanism associated with the wheel and axle.

From the chamber 81 fluid under pressure is intermittently discharged by flow through the passage 112 and ports 111 into the respective cavities 108 of the annular member 93, which revolves with the wheel and axle, as the ports are rapidly carried into and out of registration with the passage 112. Each of the cavities 108, being of relatively small volume, is thus charged with fluid at substantially the pressure of that in the conduit 80 and passage 112, and as each cavity is subsequently carried beyond the block 101 the fluid under pressure entrapped therein is free to flow through the port 111 to the atmosphere.

It will thus be seen that, due to the substantially constant supply of fluid under pressure from the brake cylinder to the passage 54 by operation of the control valve device 13 effected by operation of the diaphragm 48 and needle valve 46, a fluid pressure is maintained in the connected chamber 62 and conduit 80, which pressure is in large part determined by the frequency with which fluid under pressure is discharged from the conduit through the passage 112 in block 101 to the cavities 108 in the annular member 93 revolving with the vehicle wheel. Assuming that the application of the brake has been effected while the vehicle is traveling at a high rate of speed, in excess of 60 miles per hour for example, the venting of fluid under pressure from the conduit by way of the passage 112 into the cavities 108, as they are moved into and out of registration with the passage in rapid succession, is effective to reduce the fluid pressure in the conduit and in the chamber 62 to a relatively low value.

At this time, the fluid under pressure in the volume chamber 69 and in the chamber 61 is free to flow therefrom through the restricted passage 66 in the diaphragm 60 to the chamber 62. The fluid pressure in the chamber 61 is thus substantially equalized with that in the chamber 62, while the valve 57 is of course held in seated position as shown in the drawings under the pressure of the spring 67.

As the wheel and axle assembly subsequently begins to decelerate as result of the application of the brakes, the corresponding reduction in the frequency with which the cavities 108 in the axle carried member 93 are brought into registration with the passage 112 is effective to permit a gradual increase in the pressure of fluid in the conduit 80, by reason of the continued flow of fluid under pressure thereto past the needle valve 46 and through the restricted portion 55 of the passage 54 as hereinbefore explained.

It should be understood that the flow capacity or restricted portion or choke 55 is greater than that of the restricted passage 66 in the diaphragm 60, but that the restricted passage 66 is of such size as to permit fluid under pressure to flow therethrough from the chamber 62 to the chamber 61 at a sufficiently fast rate, under normal conditions, to prevent establishment of an appreciable differential between the pressures acting on opposite sides of the diaphragm 60. Thus while the wheel 11 is decelerated at a rate not endangering slipping thereof, the spring 67 remains effective to hold the valve 57 in seated position as shown in the drawings.

If the wheel should begin to slip, however, so that the rate of deceleration thereof is suddenly increased to an abnormal degree, the pressure of fluid in the conduit 80 and in the connected chamber 62 will consequently be suddenly increased, due to the fact that relatively little fluid under pressure is at this time withdrawn by way of the cavities 108 in the member 93 of the control pressure governor mechanism 15, while fluid under pressure is still supplied from the brake cylinder by the usual operation of the needle valve 46 through the passage 54 to the chamber. The restricted passage 46 in the diaphragm 60 is calibrated to provide such a flow area as to prevent the passage of sufficient fluid under pressure from the chamber 62 to the chamber 61 to effect the same rapid increase in fluid pressure in the chamber 61 as has thus been effected on the opposite side of the diaphragm, with the result that the diaphragm is moved against the force of the spring 67 to unseat the valve 57.

Fluid under pressure is then quickly supplied from the brake cylinder by way of the port 24, chamber 23, past the unseated valve 25, and through passage 58 to the chamber 33, and acts through the medium of the piston 31 and stem 29 to move the valve 25 away from the seat 26, whereupon fluid under pressure is admitted from the chamber 23 through the bore 30, passage 35, and port 36 to the chamber 22 on the outer or spring side of the brake cylinder piston 17. Upon the consequent equalization of the fluid pressures acting on opposite sides of the brake cylinder piston, the braking force previously exerted thereby is immediately reduced sufficiently to permit the wheel 11 to resume normal rotation at the speed corresponding to vehicle speed. It will be noted that when the piston 31 is moved to its uppermost position, the communication from the bore 39 to the chamber 34 and atmospheric exhaust ports 38 is cut off, because of sealing engagement by the gasket 40 with the seat rib 41.

As the speed of rotation of the wheel is thus restored to a value corresponding with the speed of the vehicle, the annular member 93 is again operated by the axle 12 to effect a reduction in the pressure of fluid in the conduit 80 and in the chamber 62 connected thereto, in the manner already explained, and since the continued flow of fluid under pressure from that chamber through the restricted passage 66 to the chamber 61 has meanwhile somewhat increased the fluid pressure therein, the spring 67 is once more enabled to move the diaphragm 60 to the right for seating the valve 57. With the communication from the brake cylinder by way of the passage 58 to the chamber 33 thus cut off, the fluid under pressure entrapped therein is quickly vented due to flow of fluid past the loose fitting piston 31 to the chamber 34 and atmospheric exhaust ports 38. The spring 27 is thereby rendered effective to force the valve 25 downwardly into engagement with the seat rib 26 for cutting off communication between the chamber 23 and the several communications leading to the chamber 22 at the outer side of the brake cylinder piston 17. Reapplication of the brakes is then automatically effected, assuming that the piston chamber 18 is still in communication with the fluid pressure supply through operation of the relay valve device 22 by the usual brake controlling device, not shown in the drawings. It is preferred that the parts be so designed and adjusted that the full reapplication does not take place before the wheel has returned to substantially that corresponding to vehicle speed.

It will now be apparent that, with the speed controlled anti-wheel sliding equipment just described, automatic control of an individual wheel of a vehicle during an application of the brakes is insured. According to the invention the anti-wheel slide apparatus is adapted to be operated entirely by fluid pressure, and may thus be employed with an existing fluid pressure brake equipment without the necessity of expensive alternations.

Figures 3, 4, 5:
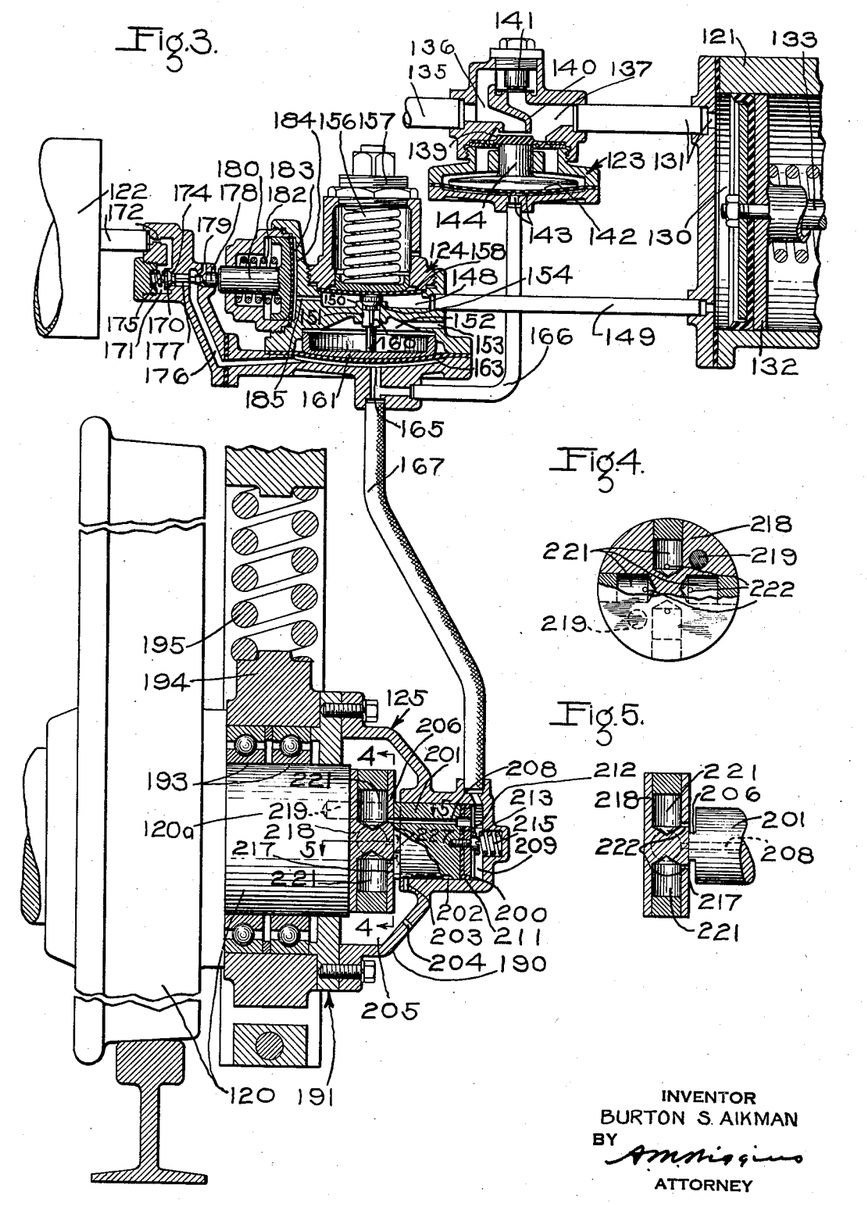
Fig. 3 is a diagrammatic elevational view, mainly in section, showing a different form of the control apparatus embodying the invention.
Fig. 4 is a sectional view taken substantially on the line 4—4 of Fig. 3.
Fig. 5 is a fragmentary sectional view taken substantially on the line 5—5 of Fig. 3.

*Apparatus shown in Fig. 3*

Illustrated in Fig. 3 of the drawings is a speed controlled equipment for a fluid pressure brake constructed in accordance with a modified form of the invention, the equipment shown comprising a wheel and axle assembly 120, a brake cylinder device 121 of usual design, a main reservoir or other reservoir adapted to be maintained charged with a substantially constant supply of fluid under pressure, indicated at 122, a cut off valve device 123, a control valve device 124, and a control pressure governor mechanism 125.

The brake cylinder device 121 comprises a cylinder having a piston chamber 130 adapted to be supplied with fluid under pressure by way of a pipe and passage 131, which cylinder has mounted therein a piston 132 subject to the pressure of fluid in the chamber 130 and operative through the medium of a piston rod 133 to effect an application of the brakes.

The supply of fluid under pressure to the chamber 130 of the brake cylinder device is in part controlled by operation of the cut-off valve device 123, which comprises a casing having an inlet chamber 136 communicating through a pipe 135 with the usual brake controlling valve devices, not shown, and also having an outlet chamber 137 communicating with the chamber 136 and with the pipe 131. Mounted within the casing of the cut-off valve device 133 is a rubber diaphragm valve 139 which is adapted for cooperation with a seat 140 for controlling communication between the chambers 136 and 137. A diaphragm 142 is mounted in the lower portion of the casing of the device 123 and is operative upon a predetermined increase in the pressure of fluid in a chamber 143 to close the diaphragm valve 139 through the medium of a follower element 144 interposed between the two diaphragms. A check valve 141, interposed between the chambers 137 and 136, is provided to permit release flow of fluid from the brake cylinder device at all times.

The control valve device 124 includes a casing structure having a valve chamber 148, which is connected through a pipe 149 with brake cylinder chamber 130, and in which is disposed a release valve element 150 controlling communication from the valve chamber by way of a bore 151 and chamber 152 to an atmospheric exhaust port 153 formed in the casing. The valve element 150 is normally urged against a seat 154 under the predetermined force of a spring 156, interposed between a cap member 157, which is adjustably secured in the casing, and a diaphragm 158, which engages the valve element 150 and is subject to the pressure of fluid in the chamber 148. The valve 150 is also controlled through the medium of a stem 160 and follower member 161 by a diaphragm 163, which is mounted in the casing structure between the chamber 153 and a pressure chamber 165 communicating through a pipe 166 with the chamber 143 of the cut-off valve device 123.

The chamber 165 of the control valve device 124 is also connected to one end of a conduit 167 leading to the pressure governor mechanism 125, hereinafter described. For maintaining a substantially constant supply of fluid under pressure to the chamber 165, a feed valve element 170 is disposed in a chamber 171 communicating through a restricted passage and pipe 172 with the reservoir 122, which valve element is urged toward a seat 174 under the force of a spring 175 and controls communication from the chamber 171 to a passage 176 connected to chamber 165. The feed valve element 170 has a fluted stem 177 which extends through the passage 176 and terminates in a valve portion 178 that is normally held in unseated position and controls communication from the passage 176 to an atmospheric exhaust port 179. The outer end of the valve portion 178 is engaged by a plunger 180, which is slidably mounted in the casing structure and is biased away from the valve portion 178 by the force of a spring 182. The plunger 180 is movable in opposition to the force of the spring 182 by a diaphragm 183 upon a predetermined increase in the pressure of fluid in a chamber 184, which communicates through a passage 185 with chamber 148.

The control pressure governor mechanism 125 is adapted to perform the same function as does the mechanism 15, shown in Fig. 1 and already described, although the two governor mechanisms differ in details of construction. The governor mechanism 125 includes a casing member 190 which is bolted or otherwise secured to a journal box structure, indicated generally by the character 191, which is carried by the wheel and axle assembly 120. The journal box structure 191 is illustrated as comprising a plurality of ball bearing assemblies 193 interposed between an axle portion 120a extending outwardly of the wheel, and a bearing member 194 suitably mounted in the corresponding side frame member of the truck, which the journal box structure is adapted to support through the medium of suitable springs, such as that indicated by the character 195. It will be understood that the wheel and axle assembly 120 is thus rotatably mounted on the journal box structure 191, which is stationary.

Slidably mounted in a bore 200 formed in the casing member 190 is a valve block member 201 formed of self-lubricating carbonaceous material, which may be cylindrical in form and is prevented from turning in the bore by suitable means, such as a longitudinal groove 202 provided in the outer surface of the block and adapted to receive a pin 203 carried by the casing member. The block member 201 extends into a central chamber 205 formed within the casing member 190 and communicating with an atmospheric opening 204, and has a reduced offset portion 206 on which is formed a flat sealing surface disposed in a plane parallel to that of the wheel 120. A calibrated or restricted passage 208 is formed within the valve block member 201 and communicates with the chamber 209 formed at the outer end of the block. For preventing leakage of fluid under pressure from the chamber 209 past the block 201, a gasket 211 is secured to the outer end of the block by means of a follower plate 212 and a screw 213 which is fitted through suitable apertures in the follower member and gasket and into a screw threaded bore in the block member. A coil spring 215 is interposed between the inner wall of the chamber 209 and the follower member 212 for urging the valve block member 201 toward the wheel and axle assembly.

The sealing surface formed on the portion 206 of the block is adapted to engage a flat sealing surface 217 formed on a circular casing element 218, which is secured to the end of the axle portion 120a by suitable means, such as pins 219 and thus in effect constitutes an extension of the axle. Formed in the member 218 are a plurality of spaced cavities or chambers 221, each of which communicates with a port 222 opening at the surface 217 of the member and adapted for registration with the restricted passage 208 in the block member 201, each of the ports being so spaced from the center of the member 218 that during a revolution of the member each port will momentarily communicate with the passage 208 and then with the atmosphere. In Fig. 3 one of the ports 222 is shown positioned in communication with a restricted passage 208; in Fig. 5 two of the passages 222 are illustrated in their atmospheric exhaust positions.

It will be understood that when the equipment just described is conditioned for operation, the reservoir 122 is charged with fluid under pressure by means of a compressor, not shown, and that the brake cylinder pipe 135 is connected to the atmosphere through the usual communications in the brake controlling valve device or triple valve device forming part of the air brake equipment but not included in the drawings. At the same time, the several valves and other movable parts of the speed controlled apparatus shown in Fig. 3 occupy the positions illustrated.

Let it now be assumed that while the vehicle is traveling at a high speed and the wheel and axle assembly 120 is consequently revolving rapidly, the brake controlling valve device of the air brake system is operated in the usual manner to supply fluid under pressure to the brake cylinder pipe 135 for effecting an application of the brakes. Fluid under pressure thus supplied by way of the pipe 135 flows through the chamber 136 and past the diaphragm valve 139 of the device 123 and thence by way of chamber 137 and pipe 131 to the brake cylinder chamber 130, causing movement of the piston 132 and rod 133 to the right for forcing the usual brake shoes against the wheel. Fluid under pressure also flows from the brake cylinder chamber 130 through pipe 149 to the chamber 148 of the control valve device 124, and thence by way of passage 185 to diaphragm chamber 184.

Upon a predetermined increase in the pressure of brake cylinder fluid in the chamber 184, which predetermined pressure may be that usually attained during a service application of the brakes, the diaphragm 180 is forced against the pressure of the spring 182 to move the valve member 178 to its seated position while moving the valve element 170 away from the seat 174. Fluid under pressure is then fed from the reservoir 122 at a rate controlled by the restricted passage 172 past the unseated valve element 170 and through passage 176 to the chamber 165, from which fluid under pressure flows through the pipe 166 to the chamber 143 of the cut-off valve device 123, and also through the conduit 167 to the chamber 209 of the control pressure governor mechanism 125 associated with the wheel and axle assembly.

Fluid under pressure thus substantially constantly supplied through the conduit 167 to the chamber 209 flows therefrom through the restricted passage 208 in the valve block 201 to each of the ports 222 and the respective chambers 221 in succession, as the member 218 is revolved with the axle. The chambers 221 are thereby momentarily charged with fluid under pressure from the chamber 209 and conduit 167 during each revolution of the axle assembly, the volume of fluid under pressure received by each chamber being vented therefrom as the chamber is moved to the position as shown in Fig. 5. As hereinbefore explained in connection with the pressure control governor mechanism 15 shown in Fig. 1, the pressure of fluid in the conduit 167 is determined by the speed of rotation of the wheel and axle assembly, and will be at a minimum value while the vehicle is traveling at maximum speed, due to the frequency with which the metered volumes of fluid are withdrawn from the constantly supplied conduit.

It will thus be understood that the fluid pressure in the chamber 165 of the control valve device 124 communicating with the conduit 167 is relatively low, during the initial application of the brakes while the vehicle is moving at high speed. Meanwhile, the fluid at the pressure of that of the brake cylinder in the chamber 148 is effective on the diaphragm 158 to oppose the force of the spring 156, so that the downward pressure tending to maintain seated the valve element 150 is reduced, but it will be understood that so long as the pressure of fluid in the chamber 165 remains at a low value corresponding to high vehicle speed, the valve element 150 is held in engagement with the seat 154.

It is to be expected that, upon the application of the brakes as just described, the speed of the vehicle will quickly begin to reduce, thus necessitating corresponding reduction in the pressure of fluid in the brake cylinder 121 in order to prevent the application of too great a braking force with respect to the speed of the vehicle, such as might result in sliding of the wheels. This function is performed by the control valve device 124, the diaphragm 163 of which is subject to the pressure of fluid in the chamber 165, which pressure is gradually increased in accordance with the decreasing speed of rotation of the wheel and axle assembly, as hereinbefore explained. With the spring 156 already subjected to the opposing pressure of the fluid acting in the chamber 148 against the diaphragm 158, the control pressure acting on the diaphragm 163 finally becomes effective to move the diaphragm, follower member 161, stem 160 and valve element 150 upwardly, whereupon fluid under pressure is vented from the brake cylinder chamber 130 to the atmosphere by way of the pipe 149, chamber 148, past the unseated valve, and through chamber 152 and port 153. The brake cylinder piston 132 is thereby relieved of a portion of the fluid pressure previously acting thereon and the brakes are consequently released sufficiently to permit continued rotation of the wheels. The degree of reduction in brake cylinder pressure thus effected is determined by the force exerted by the spring 156, which is adapted to force the diaphragm 158 downwardly and thus to seat the valve element 150 when the desired amount of fluid under pressure has been vented from the brake cylinder chamber.

It will be understood that during this operation, the pressure of fluid in the chamber 143 of the cut-off valve device, which communicates with the conduit 167, is effective through the medium of diaphragm 142 and follower member 144 to hold seated the diaphragm valve 139, so that further supply of fluid under pressure from the brake controlling valve device, not shown, to the brake cylinder is prevented. Full release of the brakes may of course be effected through the medium of the brake controlling valve device at any time, since back flow of communication from the brake cylinder chamber 130 may be established by way of the check valve 141.

When the combined pressures of fluid in the chamber 165 acting on diaphragm 163 and that of brake cylinder fluid in the chamber 148 acting on diaphram 158 are no longer sufficient to overcome the spring 156, the valve 150 is moved to the seat 154, and further reductions in brake cylinder pressure can thereafter be effected only by release operation of the brake control valve device associated therewith.

It will be understood, of course, that the speed responsive control valve device 124 may be designed to function for effecting quick release of the brakes in response to slipping of the wheel, and then to cause reapplication of the brakes after the rotative speed of the wheel has been restored to vehicle speed, in a manner similar to that in the case of the equipment shown in Fig. 1.

When the pressure of fluid in the brake cylinder chamber 130 and in the diaphragm chamber 184 of the device 124 communicating therewith has been reduced sufficiently, the spring 182 becomes effective to shift the follower member 180 to the right while the spring 175 is enabled to move the valve element 170 to its seat. Further supply of fluid under pressure from the reservoir 122 to the conduit 167 is thus cut off to avoid unnecessary loss.

Figure 6:
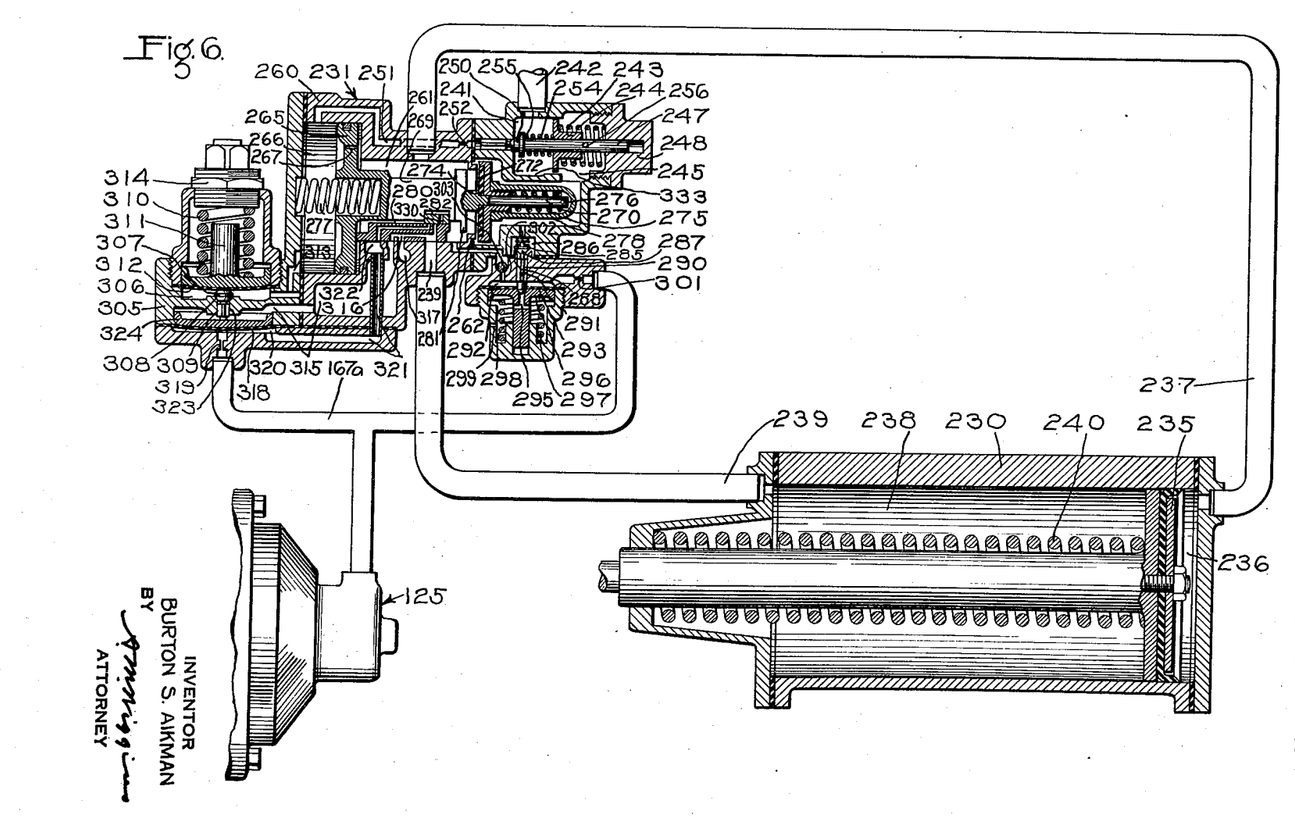
Fig. 6 is a diagrammatic elevational view, mainly in section, of a fluid pressure control apparatus embodying features of the invention in still another form.

*Apparatus shown in Fig. 6*

Features of the invention may be embodied in still another form of speed controlled brake apparatus as shown in Fig. 6 of the drawings, wherein are included a brake cylinder device 230, a control valve device 231 which corresponds to the device 124 shown in Fig. 3, and a speed responsive governor mechanism adapted to control the pressure of fluid in a conduit 167a and which is illustrated in fragmentary form and designated by the character 125, it being understood that the construction of the governor mechanism is the same as that shown in Fig. 3.

The brake cylinder device 230 comprises a cylinder having slidably mounted therein a piston 235, on one side of which is formed a chamber 236 communicating with a supply pipe 237 and on the other side of which is provided a normally vented chamber 238 communicating with a pipe 239. The piston 235 is adapted for operation to apply the brakes upon an increase in the pressure of fluid in the chamber 236. A spring 240 is provided for urging the piston 235 to release position as shown in the drawings.

The control valve device 231 comprises a casing structure having formed therein an inlet chamber 241 communicating by way of a pipe 242 with the supply port of the usual brake controlling valve device, not shown, and having loosely fitted therein a piston 243, which is subject to the opposing pressures of fluid in the chamber 241 and of a spring 244, which is interposed between the piston and the wall of a chamber 245 communicating past the piston with the chamber 241. The piston 243 is slidably mounted on a stem 247, one end of which is engaged in a bore 248 formed in the wall of the chamber 245, and the other end of which terminates in a valve 250 which controls communication from the chamber 241 to a passage 251 having a restricted portion 252. A coil spring 254 is interposed between the piston 243 and a collar 255 formed on the stem adjacent the valve 250 for urging the valve into its seated position, as shown in the drawing. A pin 256 is transversely mounted on the stem 247 within the chamber 245 and is adapted to be engaged by the piston 243 upon movement thereof against the force of the spring 244, as hereinafter explained.

Formed in a central section 260 of the casing structure of the device 231 is a valve chamber 261, which communicates with the brake cylinder pipe 237, and which also communicates with the chamber 245 by way of an opening defined within an annular seat rib 262. The end of the chamber 261 opposite the seat rib 262 is enlarged to form a bore within which is slidably mounted a piston 265, which is subject at the outer side to the pressure of fluid in a chamber 266 communicating with the passage 251, and is provided with a restricted port 267 forming communication between the chamber 266 and the valve chamber 261.

The piston 265 has a stem 269 extending through the chamber 261 and terminating in pin 270 projecting into the chamber 245, on which pin is slidably mounted a valve member 272 disposed in cooperative alignment with the annular seat rib 262. The valve member 272 is adapted to be engaged by a stop shoulder 274, formed at the juncture of the pin 270 with the stem 269, under the pressure of the coil spring 275 which is interposed between the valve member and a transversely disposed pin 276 carried on the outer end of the pin 270. The valve member 272 is thus yieldingly urged toward the seat rib 262 by the force of the spring 275, but is normally adapted to be held in an unseated position as shown in Fig. 6 under the force exerted on the piston and the stem 269 by a coil spring 277 which is interposed between a recessed surface of the piston 265 and the wall of the chamber 266. If desired, a cap or cover member 278 may be secured to the valve member 272 for enclosing the pin 270 and spring 275, and thus preventing any leakage of fluid under pressure from the chamber 245 to the chamber 261 by way of the bore in the valve member within which the pin 270 is mounted.

Mounted on a valve seat formed on the lower wall of the chamber 261 is a slide valve 280, which is operatively interposed between piston 265 and a lug 281 carried by the stem 269, and which has movably mounted on the upper surface thereof a graduating valve 282 that is disposed within a recess formed in the stem.

The chamber 245 within the casing structure of the device 231 communicates by way of a passage 285 with a valve chamber 286 having disposed therein a feed valve element 287, which is normally urged toward seated position as shown in the drawing by the force of a spring 288. The feed valve element 287 has a fluted stem 290 slidably mounted in a bore 291 forming communication between the valve chamber 286 and a diaphragm chamber 292, through which chamber the end of the stem 290 extends into seating engagement with a diaphragm 293. The diaphragm 293 has a central aperture for receiving the lower end of the stem 290, and has disposed at the side thereof opposite the chamber 292 a follower 296, which is adapted to be urged upwardly by the force of a spring 297 interposed between the follower member and the outer wall of a chamber 298 communicating with the atmosphere through a passage 299. The lower end of the stem 290 is adapted normally to close communication between the chamber 292 and the vented chamber 298, which communication may, however, be established by way of a passage 295 in the follower member in the event of excessive displacement of the diaphragm 293 in opposition to the pressure of the spring 297. The chamber 292 communicates by way of a restricted passage 301 with the conduit 167a leading to the control pressure governor mechanism 125, and also communicates by way of a passage 302 and past a ball check valve 303 with the valve chamber 261.

The control valve device 231 further comprises a casing section 305 having formed therein a valve chamber 306 within which is disposed a valve element 307 which is adapted normally to be held in engagement with a seat 308 under the force of a coil spring 310 transmitted through the medium of a follower element 311 and a diaphragm 312 that is subject to the pressure of fluid in the chamber 306. The chamber 306 communicates by way of a passage 313 with the piston chamber 266. It will be noted that the pressure exerted by the spring 310 may be varied as desired by adjusting a cap nut 314 having screw-threaded engagement with the casing structure, the spring being interposed between the cap nut and the follower member 311. The valve element 307 is adapted to control communication from the chamber 306 through a bore 309 with a volume chamber 315, with the slide valve 280 in the normal position as illustrated, is vented to the atmosphere by way of a port 316 in the slide valve and an exhaust port 317 in the casing.

For operating the valve element 307 there is provided a diaphragm 318 which is clamped withing the casing structure between the normally vented chamber 315 and a pressure chamber 320, the latter communicating by way of a restricted passage 319 with the conduit 167a and also through a passage and conduit 321 with a port 322 in the seat of the slide valve 280. The valve element 307 has a fluted stem 323 extending through the bore 309 and into engagement with a follower plate 324 which rests against the diaphragm 318 within the chamber 315.

In operation, when an application of the brakes is to be effected, the brake control valve device or triple valve device, not shown, with which the apparatus shown in Fig. 6 is associated, is operated in the usual manner to supply fluid under pressure through the pipe 242 to the chamber 241 of the control valve device 231, from which chamber fluid under pressure is free to flow past the loosely fitted piston 243, through the chamber 245, past the valve member 272, and thence by way of the valve chamber 261 and brake cylinder pipe 237 to the piston chamber 236 of the brake cylinder device 230. The brake cylinder piston 235 is thereby operated against the force of the spring 240 to effect application of the brakes against the wheels in the usual manner.

At the same time, fluid under pressure thus initially supplied to the chamber 241 of the control valve device 231 is momentarily effective to force the piston 243 outwardly against the pressure of the spring 244, and the piston is thereby moved into engagement with the pin 256 for operating the stem 247 to unseat the valve 250, so that fluid under pressure is supplied through the passage 251 through the piston chamber 266 rapidly enough to prevent the increasing pressure in the valve chamber 261 from causing movement of the piston 265 against the force of the spring 277.

Fluid under pressure supplied to the chamber 245 also flows therefrom by way of the passage 285, chamber 286 and past the normally unseated valve 287 to the diaphragm chamber 292, from which fluid under pressure is fed at a controlled rate by operation of the diaphragm 293 and feed valve 287 through the restricted passage 301 to the conduit 167a leading to the pressure governor mechanism 125 associated with the wheel and axle assembly. If the pressure of fluid in the chamber 292 is increased above a predetermined value, the spring 297 is adapted to permit movement of the diaphragm 293 downwardly as viewed in the drawing, so as to permit the spring 288 to move the valve 287 into seated position for cutting off flow of fluid under pressure to the chamber 292 until the pressure therein is again reduced by continued operation of the mechanism 125 as already explained. It will thus be understood that the valve 287 is adapted to be operated as a feed valve to supply fluid under pressure at a relatively constant rate to the conduit 167a, which conduit is in turn vented to the atmosphere by reason of operation of the mechanism 125 at a rate determined by the speed of operation of the wheel and axle assembly, so that the pressure of fluid in the conduit is substantially proportional to the speed of the vehicle.

Fluid at the pressure of that in the conduit 167a also acts in the chamber 320 against the diaphragm 318, while at the same time fluid under pressure supplied from the piston chamber 266 through the passage 313 to the chamber 306 acts against the diaphragm 312 in opposition to the force of the spring 310. As already explained, the fluid pressure in the conduit 167a and in the pressure chamber 320 gradually increases as the speed of the associated wheel and axle assembly is decreased due to the effect of the application of the brakes, and as a result, the diaphragm 318, follower member 324 and stem 323 are finally moved upwardly to lift the valve element 307 slightly away from the seat 308, thereby initially releasing fluid under pressure from the piston chamber 266 by way of the passage 313, chamber 306, bore 309, chamber 315 and ports 316 and 317.

Assuming that the retardation of the vehicle is at this time accomplished at a normal rate, the resultant increase in the pressure of fluid established in the diaphragm chamber 320 is such as to cause operation of the valve element 307 as just explained to vent fluid under pressure to the atmosphere from the chamber 266 at a relatively slow rate, so that the brake cylinder pressure in chamber 261 is rendered effective to shift the piston 265, stem 269 and valve member 272 carried thereby against the pressure of the spring 277 until the valve member is brought into engagement with the seat rib 262, in which position the spring 275 is adapted to resist further movement to the left as viewed in the drawing. In this position of the valve member 272, communication from the chamber 245 to the chamber 261 and thence to the brake cylinder is cut off, so that further increase in brake cylinder pressure is thereby prevented. While the various parts of the apparatus remain in the position just described, the pressure of fluid in the brake cylinder chamber 236 and in the connected valve chamber 261 of the control valve device is gradually reduced by flow of fluid to atmosphere through the restricted passage 267 in the piston 265, the chamber 266 and the other communications hereinbefore pointed out, this reduction in brake cylinder pressure being effected at a rate corresponding with the continued deceleration of the vehicle under normal conditions.

If the rate of deceleration of the vehicle should be such as to cause a more rapid increase in the pressure of fluid in the pressure chamber 320, but yet not at such a rate as might accompany a wheel sliding condition, the diaphragm 318 is adapted to be moved upwardly to unseat the valve element 307 for venting fluid under pressure from the piston chamber 266 quickly enough to cause the fluid pressure in chamber 261 to shift the piston 265 farther to the left as viewed in Fig. 6, so that a port 330 in the graduating valve 282 is brought into registration with the port 316 of the main slide valve 280. With the elements in this position, the supply of fluid under pressure to the brake cylinder device is cut off by the seated valve element 272, while fluid under pressure is discharged from the brake cylinder by way of the valve chamber 261, ports 330 and 316 and atmospheric port 317, thus effecting a quick partial release of the brakes to limit the effective braking force to a safe value with respect to the vehicle speed. It is normally to be expected that the reduction of fluid pressure in the brake cylinder device and in the chamber 261, as just explained, will continue for a relatively short time, since the reduction in the pressure of fluid in the chamber 261 below that in the chamber 266 quickly results in return movement of the piston 265 and graduating valve 282 to prevent further venting by way of the communication controlled thereby, after which the fluid under pressure in the brake cylinder can flow to the atmosphere only through the restricted passage 267 in the piston 265, as explained in the foregoing paragraph.

It will be understood that the reduction in brake cylinder pressure, effected as just described, is not continued after a predetermined low pressure of brake cylinder fluid has been reached, which predetermined brake cylinder pressure is attained when the reduced pressure of fluid in the diaphragm chamber 306 of the control valve device, together with the fluid pressure acting in the chamber 320 against the diaphragm 318, are no longer effective to overcome the force of the spring 310, which is then enabled to force the valve element 307 against the seat 308. It will be remembered, of course, that the feed valve element 287, diaphragm 293 and spring 297 are cooperative to limit the maximum pressure attainable in the conduit 167a. So long as the brakes are not released through the medium of the triple valve or other brake controlling valve, not shown, or in other words, while fluid under pressure is still supplied by way of the pipe 242, at least the minimum pressure of fluid in the brake cylinder as above referred to is maintained therein regardless of leakage, since the ball check valve 303 is adapted to permit flow of fluid under pressure from the diaphragm chamber 292 and through the passage 302 bypassing the closed valve element 272 to the chamber 261 and thence the brake cylinder chamber 236.

It will further be understood that if it is desired to effect the release of the brakes by release operation of the usual triple valve or brake control valve device associated with the apparatus shown in Fig. 6, following operation of the valve member 272 of the control valve device 231 as hereinbefore explained to cut off communication between the chambers 261 and 245, such release operation may readily be accomplished by establishing communication from the inlet pipe 242 to the atmosphere in the usual manner. With the pipe 242 and the chamber 241 connected thereto suddenly vented to the atmosphere, the higher pressure of fluid in the chamber 245 quickly shifts the piston 243 to the left in opposition to the spring 254 for establishing communication of large flow area between the chamber 245 and chamber 241 past a recessed wall 333, while the fluid pressure in chamber 261 acts on the large area of the valve element 272 to move the latter away from its seat 262 against the force of the spring 275. Fluid under pressure is thereupon quickly vented from the brake cylinder chamber 236 by way of the communications hereinbefore designated, and upon the consequent reduction in the fluid pressure in chamber 261, the piston 265 and elements operated thereby are returned to the normal position illustrated.

Let it now be assumed that, with the vehicle traveling along the track, fluid under pressure is supplied in the usual manner through the pipe 242 and the various communications hereinbefore traced in the control valve device 231 to the brake cylinder pipe 237 and chamber 236 at such a rate as to effect application of too great a braking force to the associated wheel and axle assembly, with the result that the wheels tend to slip with respect to the rails. As is well understood, such a slipping condition of the wheels is accompanied by an immediate reduction in the coefficient of friction between the wheel and the rail, and if uncorrected would quickly result in sliding of the wheels and the consequent wearing of flat spots thereon. According to the invention, however, the control valve device 231 is adapted to respond to an initial slipping of the wheels to effect the quick release of the braking force applied thereto for thereby restoring the normal rotation of the wheels before sliding occurs.

Referring again to Fig. 6, let it be assumed that in effecting an application of the brakes fluid under pressure has been supplied in the usual manner to the pipe 242, chambers 241 and 245, past the unseated cut-off valve 272, and through the chamber 261 and pipe 237 to the brake cylinder piston chamber 236, and that the pressure of fluid supplied to the conduit 167a by way of the feed valve 287 and associated elements is increased above the normal pressure, due to a too rapid deceleration of the associated wheel and axle assembly with respect to the vehicle speed. When the pressure of fluid in the diaphragm chamber 320 communicating with the conduit 167a is thus built up to a relatively high value, it becomes effective through the medium of the diaphragm 318, follower member 324 and stem 323 to move the valve element 307 to its uppermost position, it being understood that the fluid pressure already supplied to the chamber 306 acts on the diaphragm 312 partly to overcome the downward force of the spring 310, with the result that fluid under pressure is quickly discharged from the piston chamber 266 to the atmosphere by way of the passage 313, chamber 306, past the unseated valve member 307, and thence through the chamber 315, and ports 316 and 317.

Since the reduction of pressure in the fluid in chamber 266 is thus effected at a rate faster than that caused in the chamber 261 by flow of fluid through the restricted port 267 in the piston 265, the piston is shifted to the left against the opposing force of the spring 277 until the slide valve 280 operated thereby is moved far enough to uncover the port 239. With the port 239 uncovered, fluid under pressure is admitted from the chamber 261 by way of the port and pipe 239 to the chamber 238 of the brake cylinder device 230, so that the fluid pressures acting on opposite sides of the brake cylinder piston 235 are quickly equalized for effecting a prompt release of the brakes. The wheel and axle assembly is thereby relieved of braking force in time to prevent wheel sliding.

Shortly after movement of the piston 265 to effect release of the brakes, as just explained, the spring 310 becomes effective to force the follower member 311 and diaphragm 312 downwardly against the reduced fluid pressure in the chamber 306, thereby seating the valve member 307. The gradual flow of fluid under pressure from the chamber 261 through the restricted port 267 in the piston to the chamber 266 then causes the pressure therein to increase until the spring 277 is enabled to shift the piston and the slide valve 280 back to lap position, wherein the chamber 238 of the brake cylinder device is connected to the atmosphere through the pipe and port 239, and ports 316 and 317, while the cut-off valve member 272 remains seated on the rib 262, assuming that the supply of fluid under pressure to the chamber 245 has not meanwhile been cut off by release operation of the usual brake controlling valve or triple valve device, not shown. It will thus be apparent that reapplication of the brakes is effected following the quick release thereof, such reapplication of the brakes being effected by the fluid under pressure remaining in the brake cylinder chamber 236 and acting on the piston 235. It is preferred that the parts be so designed and adjusted that the full force of the reapplication does not become effective until the wheel rolls at non-slipping speed.

*Summary*

From the foregoing, it will be evident that any of the several different illustrated forms of brake control apparatus embodying my invention will be operative for providing exact control of the air pressure in a brake cylinder in accordance with the speed of an individual wheel and axle assembly. By employing brake release means governed by a control pressure that is predetermined by the rate at which fluid is vented by periodic operation of a wheel actuated valve device, I have provided control apparatus operable entirely by fluid under pressure and sensitive to an initial wheel slipping condition for ensuring quick release of the braking force in time to prevent wheel sliding.

It will be understood that structural details of each of the three embodiments of the invention hereinbefore described may be modified and adapted for association with various forms of fluid pressure brake apparatus, and that it is not intended to limit the scope of the invention to the embodiments disclosed herein or otherwise than by the scope of the appended claims.

Having now described my invention, what I claim as new and desire to secure by Letters Patent is:

1. Speed responsive control apparatus for association with brake cylinder means operable to apply braking force to a wheel, comprising valve means operative to vary the maximum limit of fluid pressure attainable in the brake cylinder while an application of the brakes is effected, means responsive to a predetermined increase in brake cylinder pressure for establishing a control pressure, means responsive to an increase in said control pressure for operating said valve means to reduce the pressure of fluid in the brake cylinder, and means operative in accordance with the rotative speed of the wheel for governing said control pressure.

2. Speed responsive control apparatus for association with brake cylinder means operable to apply braking force to a wheel, comprising valve means operative to vary the maximum limit of fluid pressure attainable in the brake cylinder, fluid supply means operable when an application of the brakes is effected to maintain a substantially constant flow of fluid under pressure to a communication, means operable to bleed away fluid thus supplied to the communication at a rate varying in accordance with the rotative speed of the wheel for thereby governing the pressure of the fluid, and means responsive to said governed fluid pressure for operating said valve means.

3. In a speed responsive control apparatus adapted for association with brake cylinder means operable to apply braking force to a wheel, in combination, valve means operative to vary the maximum limit of pressure attainable in the brake cylinder, fluid supply means operable when an application of the brakes is effected to maintain a substantially constant flow of fluid under pressure to a communication, means operative by the wheel for periodically withdrawing measured quantities of fluid thus supplied to the communication for thereby governing the fluid pressure in accordance with the rotative speed of the wheel, and means responsive to said governed fluid pressure for operating said valve means.

4. Speed responsive control apparatus for a brake equipment operable to apply braking force to a vehicle wheel, comprising mechanism operative to vary the maximum limit of braking force attainable in operation of said brake equipment while an application of the brakes is effected, means responsive to a predetermined increase in braking force for establishing a control fluid pressure, means responsive to an increase in said control pressure for operating said mechanism to reduce the braking force attainable, and means operative in accordance with the rotative speed of the wheel for governing said control pressure.

5. Speed responsive control apparatus for association with brake cylinder means operable to apply braking force to a wheel, comprising valve means operative to vary the maximum fluid pressure attainable in the brake cylinder, fluid supply means operable when an application of the brakes is effected to maintain a substantially constant flow of fluid under pressure to a communication, means responsive to the fluid pressure in said communication for operating said valve means, an element rotatable with the wheel and having one or more normally vented chambers opening at a face thereof, and a stationary member in sliding engagement therewith and having a port through which fluid flowing from said supply means to said communication is intermittently discharged to said chambers according to the rotative speed of said element.

6. Speed responsive control apparatus for association with brake cylinder means operable to apply braking force to a wheel, comprising valve means operative to vary the maximum fluid pressure attainable in the brake cylinder, fluid supply means operable when an application of the brakes is effected to maintain a substantially constant flow of fluid under pressure to a communication, means responsive to the fluid pressure in said communication for operating said valve means, an element rotatable with the wheel and having one or more normally vented chambers opening at a face thereof, a stationary member in sliding engagement therewith and having a port through which fluid flowing from said supply means is intermittently discharged to said chambers according to the rotative speed of said element, and means yieldingly urging said element and member together.

7. Speed responsive control apparatus for association with brake cylinder means operable to apply braking force to a wheel, comprising valve means operative to vary the maximum fluid pressure attainable in the brake cylinder, fluid supply means operable when an application of the brakes is effected to maintain a substantially constant flow of fluid under pressure to a communication, means responsive to the fluid pressure in said communication for operating said valve means, an element rotatable with the wheel and having one or more normally vented chambers opening at a face thereof, and a stationary member composed of self-lubricating carbonaceous material in sliding engagement with said face and having a port through which fluid flowing from said supply means through said communication is intermittently discharged to said chambers according to the rotative speed of said element.

8. Speed responsive control apparatus adapted for association with brake cylinder means operable to apply braking force to a wheel and axle assembly, comprising valve means operative to vary the maximum limit of fluid pressure attainable in the brake cylinder, a casing therefor having a control chamber, fluid supply means operable when an application of the brakes is effected to establish a substantially constant flow of fluid under pressure to said chamber, means responsive to variations in the pressure of fluid in said chamber for operating said valve means, a rotary element carried by the axle having a plurality of normally vented cavities opening at a bearing face thereof, and a non-rotating member mounted in sliding relation with the bearing face of said element and having a port adapted to establish communication from said chamber to said cavities in succession for thereby varying the fluid pressure in the chamber according to the rotative speed of the wheel and axle assembly.

9. Automatic brake control apparatus adapted to be associated with brake cylinder means operable to apply braking force to a wheel, comprising means operative upon a predetermined increase in the pressure of fluid in said brake cylinder means to establish a control fluid pressure varied inversely in accordance with the rotative speed of the wheel, fluid pressure responsive means subject to said control pressure, and valve means adapted for operation by said pressure responsive means upon a sudden increase of predetermined degree in said control pressure for quickly venting fluid under pressure from said brake cylinder.

10. Automatic brake control apparatus adapted to be associated with brake cylinder means operable to apply braking force to a wheel, comprising means operative by fluid under pressure supplied to the brake cylinder to establish a control fluid pressure varied in accordance with the rotative speed of the wheel, said control pressure gradually increasing substantially in proportion to a gradual reduction in wheel speed, fluid pressure responsive means subject to said control pressure, and valve means adapted for operation by said pressure responsive means upon a sudden increase of predetermined degree in said control pressure for quickly venting fluid under pressure from said brake cylinder.

11. In a fluid pressure brake equipment for a wheeled vehicle including a brake cylinder adapted to be supplied with fluid pressure for effecting an application of the brakes, in combination: fluid pressure responsive control valve means operable to cut off the supply of fluid under pressure to the brake cylinder and to vent fluid under pressure therefrom for reducing the braking force applied thereby, fluid pressure responsive feed valve means operative upon a predetermined increase in brake cylinder pressure to effect a substantially constant supply of fluid under pressure to said control valve means, and a fluid pressure governor mechanism operative by a wheel of the vehicle to effect intermittent withdrawal of fluid under pressure from said control valve means so as to vary the fluid pressure acting thereon in proportion to vehicle speed.

12. In a fluid pressure brake equipment for a wheeled vehicle including a brake cylinder adapted to be supplied with fluid under pressure for effecting an application of the brakes, in combination: casing means providing a control pressure chamber, fluid pressure responsive feed valve means operable to effect a substantially constant supply of fluid under pressure to said chamber, fluid pressure governor means operative by a wheel of the vehicle to effect intermittent withdrawal of fluid under pressure from said chamber for varying the fluid pressure therein in proportion to the vehicle speed, control valve means operable to cut off the supply of fluid under pressure to the brake cylinder and to vent fluid therefrom for reducing the braking force applied thereby, a spring, and movable abutment means subject to the opposing pressures of fluid in said chamber and of said spring for actuating said control valve means.

13. In a fluid pressure brake equipment for a wheeled vehicle including a brake cylinder adapted to be supplied with fluid under pressure for effecting an application of the brakes, in combination: casing means providing a control pressure chamber, fluid pressure responsive feed valve means operable to effect a substantially constant supply of fluid under pressure to said chamber, control pressure governor means operative by a wheel of the vehicle to effect intermittent withdrawal of fluid under pressure from said chamber for varying the fluid pressure therein in proportion to the vehicle speed, control valve means operable to cut off the supply of fluid under pressure to the brake cylinder and to vent fluid therefrom for reducing the braking force applied, a volume chamber formed in said casing means, a spring disposed therein, and a movable abutment having a restricted port and subject on one side to the pressure of said spring and of fluid in said volume chamber and on the opposite side to the fluid pressure in said control chamber, said abutment being operative upon a sudden variation of control pressure to cause unseating of said control valve means for a limited interval, whereby the brakes are quickly reduced to prevent wheel sliding and then conditioned for a reapplication.

14. In a fluid pressure brake equipment for a wheeled vehicle, in combination, a brake cylinder having piston means operative under the pressure of fluid supplied at the application side thereof to apply the brakes and upon supply of fluid at the opposite side of said piston to release the brakes, casing means providing a control chamber, fluid pressure responsive feed valve means operable by fluid under pressure supplied at the application side of said piston means to effect a substantially constant supply of fluid under pressure to said chamber, fluid pressure governor means operative by a wheel of the vehicle to effect intermittent withdrawal of fluid under pressure from said chamber for varying the pressure of fluid therein in proportion to the vehicle speed, and fluid pressure responsive control valve means operative upon a sudden variation in fluid pressure in said control chamber to establish communication through which fluid at the application side of said brake cylinder piston means can flow to the opposite side thereof for quickly effecting the release of the brakes.

15. In a fluid pressure brake equipment for a wheeled vehicle, in combination, a brake cylinder having piston means operative under the pressure of fluid supplied at the application side thereof to apply the brakes and upon supply of fluid at the opposite side of said piston to release the brakes, casing means providing a control chamber, fluid pressure responsive feed valve means operable by fluid under pressure supplied at the application side of said piston means to effect a substantially constant supply of fluid under pressure to said chamber, fluid pressure governor means operative by a wheel of the vehicle to effect intermittent withdrawal of fluid under pressure from said chamber for varying the pressure of fluid therein in proportion to the vehicle speed, and fluid pressure responsive control valve means operative upon a sudden variation in fluid pressure in said control chamber first to establish communication from the application side of said brake cylinder means to the opposite side thereof and then to cut off said communication while venting fluid under pressure from said opposite side.

BURTON S. AIKMAN.